B. S. MAHAFFEY.
SPRING AXLE.
APPLICATION FILED APR. 11, 1912.

1,050,673.

Patented Jan. 14, 1913.

2 SHEETS—SHEET 1.

Witnesses

Inventor
B. S. Mahaffey
By Victor J. Evans
Attorney

B. S. MAHAFFEY.
SPRING AXLE.
APPLICATION FILED APR. 11, 1912.

1,050,673.

Patented Jan. 14, 1913.

2 SHEETS—SHEET 2.

Witnesses
G R Peirce
J W Garner

Inventor
B. S. Mahaffey

By Victor J. Evans
Attorney

UNITED STATES PATENT OFFICE.

BENJAMIN S. MAHAFFEY, OF ASTORIA, NEW YORK.

SPRING-AXLE.

1,050,673.　　　　　Specification of Letters Patent.　　Patented Jan. 14, 1913.

Application filed April 11, 1912. Serial No. 690,032.

*To all whom it may concern:*

Be it known that I, BENJAMIN S. MAHAFFEY, a citizen of the United States, residing at Astoria, Long Island, State of New York, have invented new and useful Improvements in Spring-Axles, of which the following is a specification.

This invention is an improved spring axle and more especially a spring axle for use on an automobile or other like vehicle, the object of the invention being to provide an improved axle of this kind by means of which the wheels are always kept in vertical, parallel position, irrespective of the vertical angular movement of the axle occasioned by inequalities in the road surface.

Another object is to effect improvements in the construction of the steering rod which connects the steering arms or movable members of the axle.

Another object is to provide means to prevent excessive vertical movement of the steering arms which carry the wheels.

With the above and other objects in view, the invention consists in the construction, combination and arrangement of devices, hereinafter described and claimed.

Figure 1:
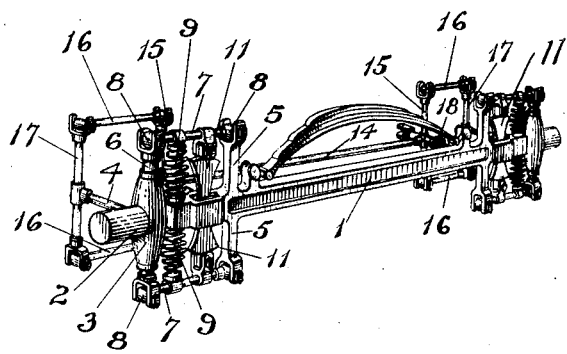
Figure 2:
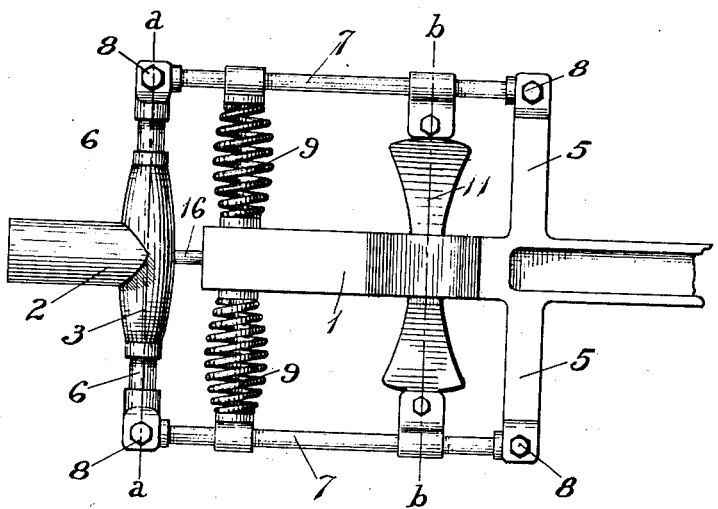
Figure 3:
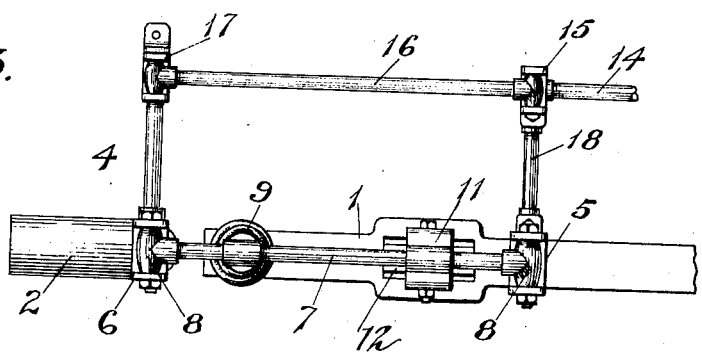
Figure 4:
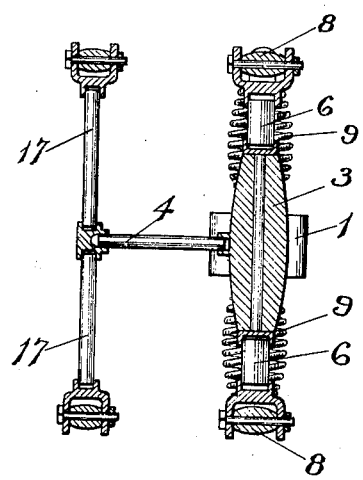
Figure 5:
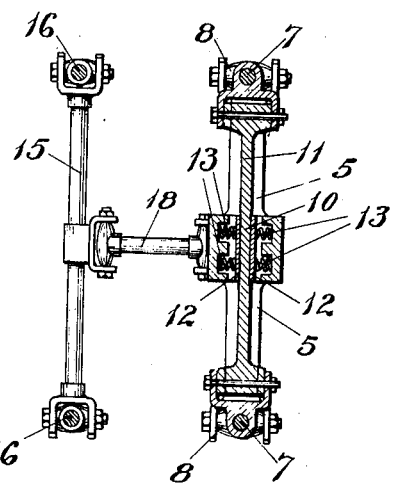
Figure 6:
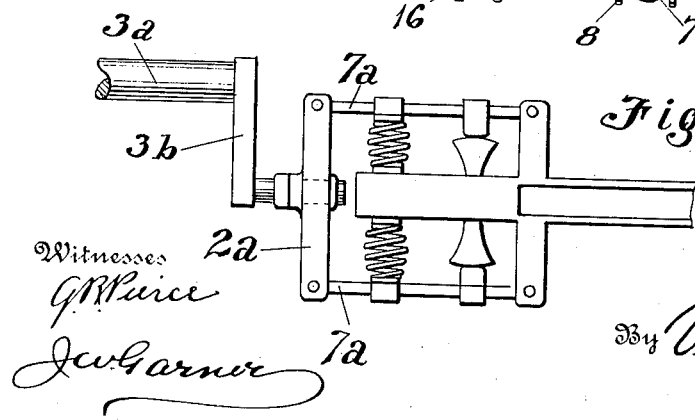

In the accompanying drawings:—Figure 1 is a perspective view of an automobile axle and steering rod constructed in accordance with my invention. Fig. 2 is a detail front elevation of a portion of the same, on a larger scale. Fig. 3 is a detail plan of the same. Fig. 4 is a detail vertical sectional view of the same on the plane indicated by the line *a—a* of Fig. 2. Fig. 5 is a similar view on the plane indicated by the line *b—b* of Fig. 2. Fig. 6 is a diagrammatic elevation, showing a portion of a rear axle constructed in accordance with my invention.

The central relatively fixed member of the axle is indicated at 1 and the steering arms or pivoted angularly movable members which carry the wheels are indicated at 2, each of the steering arms or movable members being provided with the usual spindle 3 on which the wheel is mounted and also with a rearwardly extending arm 4. One of these arms has a rearward extension to which the usual steering mechanism is connected.

In accordance with my invention, I provide the relatively fixed member 1 of the axle with vertical cross arms 5 at its ends and I also provide each steering arm or movable member with a similar vertical cross arm 6 in the angle between the spindle 3 and the arm 4. I also provide parallel links 7 which are pivotally connected as at 8 to the upper and lower ends of the cross bars 5—6, and which while adapting the steering arms or movable members to move independently of each other and to the fixed member 1 by their coaction with the cross bars 5—6, keep the planes of the said steering arms always parallel with the plane of the fixed member 1 so that the wheels which are mounted on the spindles 3 are at all times kept in the exact vertical position, irrespective of any inequalities in the road surface or whether one side of the road is higher than the other or not. The steering arms are pivotally mounted at the centers of the bars 6 so that they may be turned in a horizontal plane to admit of the steering of the vehicle.

To support the steering arms, I provide counteracting springs 9 which are shown here as coil springs arranged between the ends of the relatively fixed axle member 1 and the parallel links 7. These springs while supporting the steering arms and their connections with the relatively fixed axle member also serve to cushion the vertical movements of said steering arms so as to cause the vehicle to ride easily and smoothly.

The relatively fixed member 1 of the axle is provided near each end with a vertical slot 10. The parallel links 7 are connected together by friction bars 11, the said bars extending through the said slots and being pivotally connected at their upper and lower ends to the parallel links. The said friction bars widen from their centers to their ends and are connected or engaged on opposite sides by friction plates 12, the friction plates being held in frictional engagement with opposite sides of the friction bars by means of springs 13. These springs, friction plates and friction bars coact to prevent excessive vertical angular movement of the links 7 and corresponding vertical movement of the steering arms and when one of the steering arms moves upwardly or downwardly, relatively to the fixed member 1 of the axle, the friction bar, owing to the fact that it widens from its center to its ends presents a constantly increasing friction surface to the action of the spring-pressed friction plates so that relatively increased frictional resistance is offered to the vertical movement of the friction bar, and, hence, excessive movement of the steering arms is prevented.

The steering rod which is employed in connection with my improved spring axle has an intermediate member 14 which is provided at its ends with vertical cross bars 15. These vertical cross bars are pivotally connected to the inner ends of pairs of parallel links 16, the outer ends of which are connected pivotally to vertical cross bars 17, the central portions of which are rigidly secured to the arms 4 of the steering arms or movable members of the axle. The ends of the intermediate member 14 of the steering rod are connected by horizontally swinging links 18 to the central portions of the vertical cross bars 5 of the relatively fixed axle member 1. These horizontally swinging links 18 enable the steering rod to move toward and from the fixed member 1 of the axle as required by the longitudinal movement of the steering rod in turning the steering arms 2 on their pivotal connection with the vertical cross bar 6 and the parallel links 16 accommodate themselves under all conditions to the vertical angular movement of the parallel links 7 of the axle.

In Fig. 6, I show a modified construction in which the axle is arranged for use as a rear axle. In order to enable the rear wheels to move in an arc concentric with the usual driving sprocket wheel of an automobile, the spindle 3$^a$ for each rear wheel is formed on a crank 3$^b$ which is pivotally connected to the vertical member 2$^a$ which is arranged between the outer ends of the links 7$^a$.

While I have herein shown and described a form of my invention which I now prefer, I would have it understood that changes may be made in the form, construction and proportion of the several parts, without departing from the spirit of my invention and within the scope of the appended claims.

I claim:—

1. The combination of a relatively fixed axle member, a vertically movable wheel carrying member, parallel links connecting said relatively fixed member and said wheel carrying member, adapting the latter for vertical movement with respect to the fixed member and serving to keep said wheel carrying member always in a horizontal plane, parallel with that of the relatively fixed member, supporting springs for the wheel carrying member, friction bars connecting the parallel links, the said friction bars widening from their centers to their ends, and spring pressed friction plates carried by the relatively fixed axle member and engaging said friction bars to prevent excessive vertical spring movement of the wheel carrying member.

2. The combination of a relatively fixed axle member, parallel links pivotally connected thereto, supporting springs engaging said parallel links, a pivotal member connecting the outer ends of the parallel links and pivotally connected thereto, and a wheel carrying member mounted on the said pivotal member for angular movement in a horizontal plane, the said parallel links serving to keep the wheel carrying member always in a horizontal plane parallel with that of the relatively fixed member.

3. The combination of a relatively fixed axle member, a vertically movable wheel carrying member, parallel links connecting said relatively fixed member and said wheel carrying member, adapting the latter for vertical movement with respect to the fixed member and serving to keep said wheel carrying member always in a horizontal plane parallel with that of the relatively fixed member, supporting springs for the wheel carrying member, and means to prevent excessive vertical spring movement of the wheel carrying member.

4. The combination of a relatively fixed axle member, a vertically movable wheel carrying member, parallel links connecting said relatively fixed member and said wheel carrying member, adapting the latter for vertical movement with respect to the fixed member and serving to keep said wheel carrying member always in a horizontal plane parallel with that of the relatively fixed member, supporting springs for the wheel carrying member, means to prevent excessive vertical spring movement of the wheel carrying member, and comprising friction elements.

5. The combination of a relatively fixed axle member, a vertically movable wheel carrying member, parallel links connecting said relatively fixed member and said wheel carrying member, adapting the latter for vertical movement with respect to the fixed member and serving to keep said wheel carrying member always in a horizontal plane parallel with that of the relatively fixed member, supporting springs for the wheel carrying member, means to prevent excessive vertical spring movement of the wheel carrying member, and comprising spring pressed friction elements.

6. The combination of an axle comprising a relatively fixed member, wheel carrying members, pivotal elements on which the wheel carrying members are mounted for angular movement in a horizontal plane, parallel links connecting said pivotal elements and said relatively fixed axle member, a steering rod, links pivotally connected thereto and to the relatively fixed axle member and admitting of longitudinal movement of said steering rod with respect to the relatively fixed axle member, vertical cross bars connected to the ends of the steering rod and to the wheel carrying members and parallel links connecting and pivotally connected to said cross bars.

In testimony whereof I affix my signature in presence of two witnesses.

BENJAMIN S. MAHAFFEY.

Witnesses:
DAVID W. THOMPSON,
ISAAC B. THOMPSON.